United States Patent
Magrini et al.

(10) Patent No.: US 9,291,258 B2
(45) Date of Patent: Mar. 22, 2016

(54) JOYSTICK CONTROL FOR A CHANGE SPEED GEARBOX

(75) Inventors: Sergio Magrini, Modena (IT); Tiziano Salvini, Tribiano (IT)

(73) Assignee: CNH Industrial America LLC, New Holland, PA (US)

( * ) Notice: Subject to any disclaimer, the term of this patent is extended or adjusted under 35 U.S.C. 154(b) by 519 days.

(21) Appl. No.: 13/703,424

(22) PCT Filed: Jun. 1, 2011

(86) PCT No.: PCT/EP2011/059056
§ 371 (c)(1),
(2), (4) Date: Mar. 21, 2013

(87) PCT Pub. No.: WO2011/157558
PCT Pub. Date: Dec. 22, 2011

(65) Prior Publication Data
US 2013/0192404 A1    Aug. 1, 2013

(30) Foreign Application Priority Data
Jun. 15, 2010  (IT) .............................. TO2010A0513

(51) Int. Cl.
F16H 59/02     (2006.01)
F16H 59/04     (2006.01)
(Continued)

(52) U.S. Cl.
CPC ........ *F16H 59/0278* (2013.01); *F16H 59/0204* (2013.01); *F16H 59/042* (2013.01); *F16H 61/36* (2013.01); *G05G 1/04* (2013.01); *F16H2059/026* (2013.01); *F16H 2059/0273* (2013.01); *F16H 2059/0295* (2013.01); *Y10T 74/2014* (2015.01)

(58) Field of Classification Search
CPC .............. F16H 59/02; F16H 2059/026; F16H 2059/0273; F16H 2059/0295; F16H 61/36; F16H 59/0278; F16H 59/0204; F16H 2059/0221; F16H 2059/0226; F16C 1/10
USPC ......... 74/335, 473.1, 473.14, 473.15, 473.21, 74/473.3, 473.33, 473.35, 471 XY, 500.5
See application file for complete search history.

(56) References Cited

U.S. PATENT DOCUMENTS 2,961,890 A * 11/1960 Marshall .................... 74/473.26
3,527,115 A *  9/1970 Muhleck .................... 74/473.26
(Continued)

FOREIGN PATENT DOCUMENTS

DE   4422795 A1 *  1/1995  .............. F16H 61/36
EP   1452782 A2 *  9/2004  .............. F16H 61/22

*Primary Examiner* — William Kelleher
*Assistant Examiner* — Bobby Rushing, Jr.
(74) *Attorney, Agent, or Firm* — Sue C. Watson

(57) ABSTRACT

A joystick control is disclosed for a change speed gearbox in which two selector are separately controllable remotely. The joystick control comprises a support body, an axle rotatably supported by the body, and an operating lever connected to the axle by a pivot pin such that the operating lever is rotatable about the axis of the axle in one plane and is pivotable relative to the axle about the axis of the pivot pin in an orthogonal plane. Two actuating members are rotatably supported by the axle and arranged one on each side of the operating lever. Each actuating member is connectable by a respective Bowden cable to one of the selectors of the gearbox and extends and retracts the cable in response to rotation of the actuating member about the axle. Mating formations on the operating lever and the actuating members allow the operating lever to be engaged selectively for rotation with one or the other of the actuating members in dependence upon the direction in which the operating lever is pivoted relative to the axle about the pivot pin.

17 Claims, 2 Drawing Sheets

(51) Int. Cl.
   *F16H 59/10* (2006.01)
   *F16H 61/36* (2006.01)
   *G05G 1/04* (2006.01)

(56) References Cited

U.S. PATENT DOCUMENTS

| | | | | |
|---|---|---|---|---|
| 4,245,521 A | * | 1/1981 | Osborn | 74/473.15 |
| 4,343,202 A | * | 8/1982 | Osborn | 74/473.23 |
| 4,438,657 A | * | 3/1984 | Nobis | F16H 59/042 74/473.19 |
| 5,287,743 A | * | 2/1994 | Doolittle et al. | 74/471 XY |
| 6,550,351 B1 | * | 4/2003 | O'Reilly | F16H 59/105 74/335 |
| 6,598,494 B1 | * | 7/2003 | Giefer | F16H 59/0204 74/471 XY |
| 7,587,958 B2 | * | 9/2009 | Gorman et al. | 74/473.25 |
| 8,863,603 B2 | * | 10/2014 | Patzold | F16H 59/0204 74/473.25 |

* cited by examiner

JOYSTICK CONTROL FOR A CHANGE SPEED GEARBOX

CROSS REFERENCE TO RELATED APPLICATIONS

This application is the US National Stage filing of International Application Serial No. PCT/EP2011/059056, entitled "A JOYSTICK CONTROL FOR A CHANGE SPEED GEARBOX," filed on Jun. 1, 2011, which claims priority to Italian Application Serial No. TO2010A000513, filed Jun. 15, 2010, each of which is incorporated herein by reference in its entirety for all purposes.

FIELD OF THE INVENTION

The present invention relates to a joystick for remotely controlling the gear selection of a change speed gearbox, in particular that of an agricultural vehicle.

BACKGROUND OF THE INVENTION

In a four speed gearbox, the operating lever by means of which the desired gear ratio or "speed" is selected, is guided to move in an "H" shape. The uprights of the "H" define gear selection channels and the horizontal path between the two gear selection channels defines the neutral position of the gearbox, i.e. the setting in which the input shaft is totally disengaged from the output shaft. By first sliding the operating lever into the left gear selection channel and then moving it to the "up" position, the first speed is selected. If the operating lever is kept in the left gear selection channel but moved from the "up" position, through the neutral position, to the "down" position, the second speed is selected. To select the third speed, while in neutral the operating lever is first moved to the right gear selection channel and then "up". Finally, downward movement of the operating lever while in the second gear selection channel will engage the fourth speed.

Typically, the gear stick is supported between two selectors, often referred to as selector forks on account of their shape. Each of the selectors slides a dog along a shaft to couple gears for rotation with the shaft. One of the selectors selects first and second speed while the other selector selects third and fourth speed. As the gear stick is pivoted from side to side while the gearbox is in neutral, it engages with one or other of the two selectors.

Joysticks are known for remotely controlling change speed gearboxes in a vehicle. In known designs, the operating lever on the joystick is connected to the gear stick of the gearbox by means of two Bowden cables. One of the cables ensures that the gear stick is moved horizontally to engage the appropriate selector as the operating lever on the joystick is moved from side to side and the other moves the gear stick up and down to select the desired speed as the operating lever of the joystick is moved up and down.

A major drawback of known joysticks is the lack of "feel" in the operating lever. It is desirable for the operating lever to require short crisp movements in an H shape and for it to offer resistance to side to side movement once a speed has been selected while permitting free side to side movement when the gearbox is in neutral. Such precise control is not achieved with known designs, which have also suffered from being bulky and of complicated construction.

SUMMARY OF THE INVENTION

With a view to mitigating the foregoing disadvantages, there is provided in accordance with a first aspect of the present invention, a joystick control for a change speed gearbox comprising a support body, an axle rotatably supported by the body, an operating lever connected to the axle by a pivot pin having an axis perpendicular to that of the axle such that the operating lever is rotatable about the axis of the axle and is pivotable relative to the axle about the axis of the pivot pin, two actuating members rotatably supported by the axle and arranged one on each side of the operating lever, each actuating member being connectable to a respective Bowden cable to extend and retract the cable in response to rotation of the actuating member about the axle, and mating formations on the operating lever and the actuating members operative to engage the operating lever selectively for rotation with one or the other of the actuating members in dependence upon the direction in which the operating lever is pivoted relative to the axle about the pivot pin.

Conveniently, each of the actuating members is rotatable by the operating lever between a neutral position, an "up" position in which the associated Bowden cable is extended and a "down" position in which the associated Bowden cable is retracted.

Preferably, the mating formations on the operating lever and the actuating members are such that the operating lever may only be disengaged from one of the actuating members an engaged with the other when both the actuating members are in their respective neutral positions.

It is an important advantage of the preferred embodiments of the invention that the side to side movement of operating lever, that is to say the pivoting of the operating lever about the pin relative to the axle, has no effect on the Bowden cables and is not transmitted to the gearbox in any way. Such pivoting serves only to select the actuating member and the Bowden cable that is affect when the operating lever is moved up or down from its neutral position.

In a second aspect of the invention, there is provided a gearbox connected by two Bowden cables to a joystick control as set forth above, wherein the gearbox has two gear ratio selectors, a first selector being movable by the first Bowden cable from a neutral position in one direction to select a first gear ratio and from the neutral position in the opposite direction to select a second gear ratio, and the second first selector being movable by the second Bowden cable from a neutral position in one direction to select a third gear ratio and from the neutral position in the opposite direction to select a fourth gear ratio.

Instead of controlling the up and down and side to side movement of a single gear stick on the gearbox that interacts with two selectors within the gearbox, the joystick of the invention uses Bowden cables to control the position of two selectors in the gearbox separately. The choice of selector is determined by the horizontal movement of the operating lever of the joystick. Because of this, the horizontal movement of the operating lever does not need to relayed to any component of the gearbox by a Bowden cable.

The mating formations may suitably comprise notches in the sides of the actuating members for receiving a shaft of the operating lever.

A spring may furthermore be provided to urge the operating lever to engage in the notch of one of the actuating members.

It is an advantage of the joystick control of the invention that the support body, the axle, the operating lever, and the actuating members may be formed of a plastics material. For improved strength, the plastics material of the operating lever, the actuating members and the support body may be a glass fibre reinforced resin.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 4:
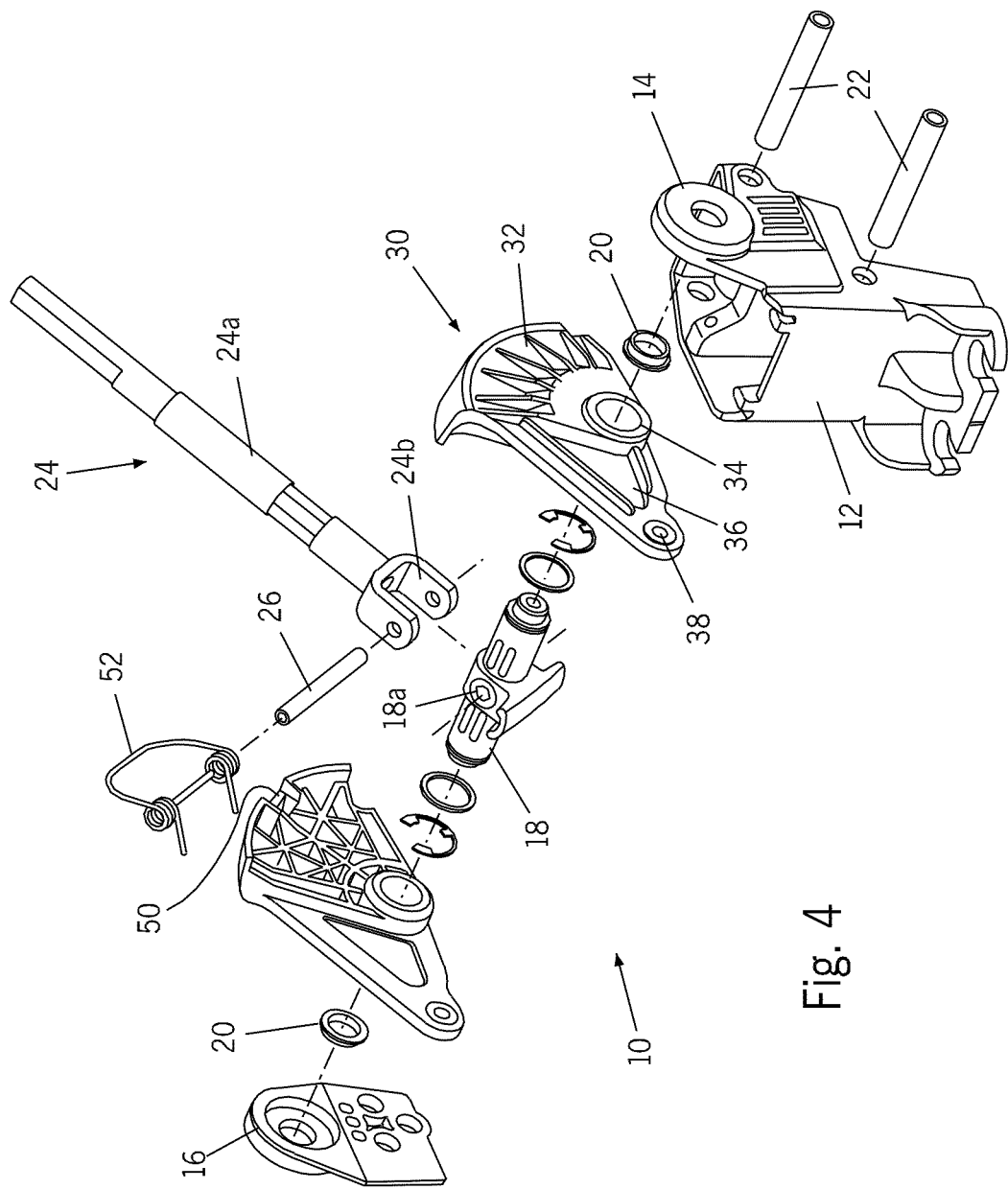
FIG. 4 is an exploded perspective view of the joystick control of FIGS. 1 to 3.

The joystick control 10, as most clearly shown in FIG. 4, comprises a main support body 12 formed with pillar blocks 14 and 16 within which an axle 18 is journalled on bearing bushes 20. The support body 12 is formed in two symmetrical halves that are joined to one another by rolled steel pins 22. The pins 22 may be replaced by rivets, screws or bolts and serve only to hold the two halves of the support body 12 together.

An operating lever 24 is connected to the axle 18 by means of a pivot pin 26. The operating lever 24 has a shaft 24a that is moved in the same way as the gear stick of a conventional H-gate gearbox, with a fork 24b at one end that straddles the axle 18 and receives the pin 26 which passes through a hole 18a in the axle 18 extending at right angles to the rotational axis of the axle 18. In this way, the shaft 24a can be pivoted about the pin 26 relative to the axle 20 in the plane containing the axes of the axle 18 and the shaft 24a but rotates with the axle 18 in the orthogonal plane.

Two mirror symmetrical actuating members 30 are mounted on the axle 18 on opposite sides of the operating lever 24. Each actuating member 30 has a sector-shaped part 32 centred on a bearing 34 through which the axle 18 passes. Each actuating member 30 also has an extension arm 36 have a hole 38 at its end to receive a pin 40 by means of which the arm 36 is connected to the end of the inner cable 42 of a Bowden cable 44 of which the outer sheath is anchored to the support body 12 (see FIG. 1). Thus, rotation of each actuating member 30 clockwise as viewed in FIG. 4 (i.e. counter-clockwise as view in FIG. 1), will result in the inner cable 42 being extended, while rotation of an actuating member in the opposite direction will cause the connected inner cable 42 to be retracted into its sheath.

The radially outer surfaces of the of the actuating members 30 are formed with notches 50 that can receive the shaft 24a of the operating lever 24. Each notch is large enough to full accommodate the shaft 24a so that when it rests within the notch 50 of one of the actuating members 30, the operating lever 24 is fully disengaged from the other.

At their opposite ends, the Bowden cable acts directly on two selectors of the gearbox. One of the Bowden cables moves a selector for engaging the first and second speeds and the other acts on a different selector used for engaging the third and fourth speeds.

Figure 1:
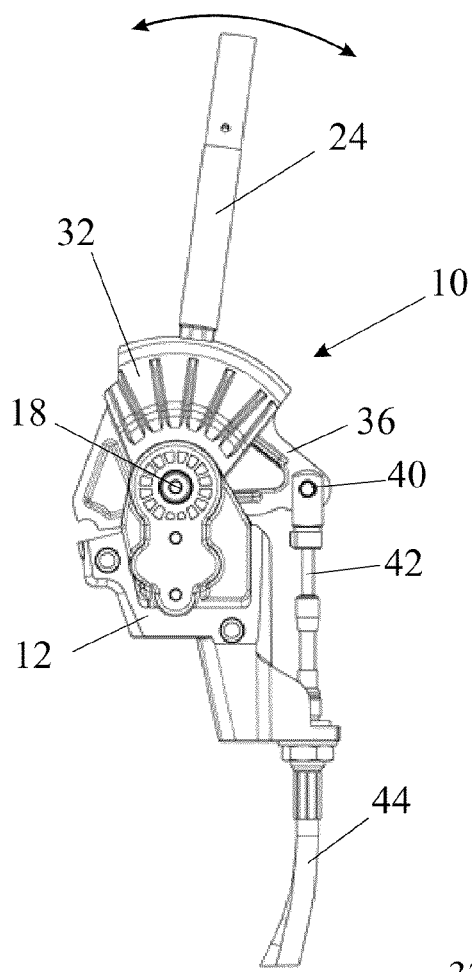
FIG. 1 is a side view of an assembled joystick control of the invention.
Figure 3:
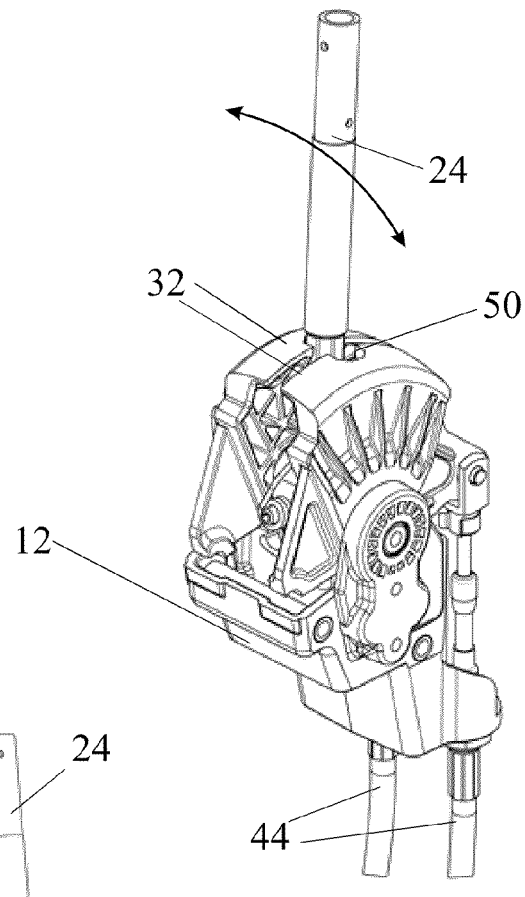
FIG. 3 is a perspective view of the joystick control of FIGS. 1 and 2.
Figure 2:
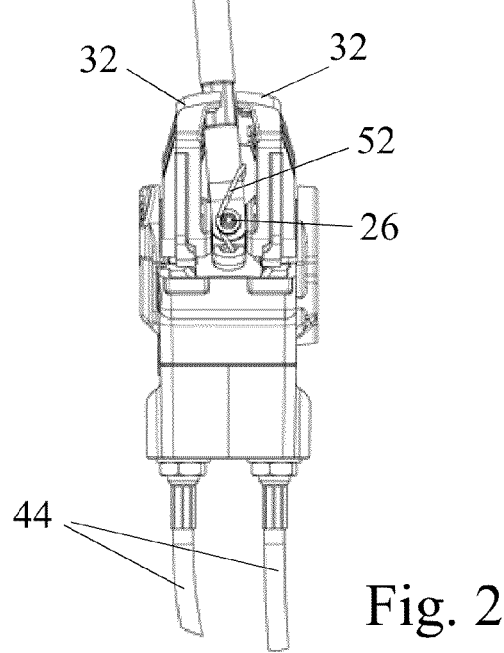
FIG. 2 is an end view of the joystick control of FIG. 1.

The joystick control is shown in FIGS. 1 to 3 with the operating lever 24 in the neutral position. Here, the two notches 50 of the two actuating members are in line with one another and the operating lever 24 can be pivoted about the pin 26 to rest wholly within either notch 50. A spring 52 is used to bias the operating lever to the left as viewed in FIG. 2, to engage within the notch of the actuating member 30 for selecting the first and second speeds.

If the operating lever 24 is moved from this rest position, clockwise as viewed in FIG. 1, this is equivalent to moving a gear stick up and will move the appropriate selector within the gearbox to select first speed. When the first speed is selected, the operating lever 24 cannot be moved from side to side because it is no longer aligned with the notch of the other actuating member 30. Hence, there is no sloppy movement of operating lever and the only direction in which the operating lever can move is counter-clockwise back towards the neutral position.

In the same way, of the operating lever is moved down (counter-clockwise in FIG. 1) the second speed will the engaged.

Only while the gearbox is in neutral is it possible disengage the shaft 24a of the operating lever 24 from the notch 50 in one of the actuating member and engage it in the notch 50 of the other. Thus after returning to neutral, the operating lever 24 can be moved across to the engage in the notch of the actuating member 50 connected by the other Bowden cable to the second selector of the gearbox, to permit the third and fourth speeds to be selected by using the operating lever 24 to rotate the other actuating member 30 is the appropriate direction.

In the preferred embodiment of the invention, most of the components of the joystick control are made of a plastics material. In particular, the axle 18 is preferably form of PPS (polyphenylene sulfide) polymer, the bearing bushes 20 of POM (polyoximethylene) omopolymer, the operating lever 24 and the actuating members 30 of a glass fibre reinforced nylon such as PA66 35GF (polyamide with 35% glass fibre).

The invention claimed is:

1. A joystick control for a change speed gearbox, comprising:
    a support body;
    an axle rotatably supported by the body;
    an operating lever connected to the axle by a pivot pin having an axis perpendicular to that of the axle such that the operating lever is rotatable about the axis of the axle and is pivotable relative to the axle about the axis of the pivot pin;
    first and second actuating members rotatably supported by the axle, the first actuating member being disposed on a first side of the operating lever and defining a first opening configured to receive one end of the axle, the second actuating member being disposed on an opposite second side of the operating lever and defining a second opening configured to receive an opposed end of the axle, each actuating member being connectable to a respective Bowden cable to extend and retract the cable in response to rotation of the actuating member about the axle; and
    mating formations on the operating lever and each of the first and second actuating members to engage the operating lever selectively for rotation with one of the first actuating member or the second actuating member in dependence upon a direction in which the operating lever is pivoted relative to the axle about the pin.

2. A joystick control as claimed in claim 1, wherein each of the first and second actuating members is rotatable by the operating lever between a neutral position, an up position in which the associated Bowden cable is extended and a down position in which the associated Bowden cable is retracted.

3. A joystick control as claimed in claim 2, wherein the mating formations on the operating lever and the first and second actuating members are such that the operating lever can only be disengaged from one of the actuating members and engaged with the other when both the first and second actuating members are in their respective neutral positions.

4. A joystick control as claimed in claim 3, wherein the mating formations comprise a first notch defined in the first actuating member and a second notch defined in the second actuating member, the first and second notches being configured to selectively receive in the operating lever in dependence upon a direction in which the operating lever is pivoted relative to the axle about the pin.

5. A joystick control as claimed in claim 4, wherein a spring is provided to urge the operating lever to engage one of the first notch or the second notch.

6. A joystick control as claimed in claim 5, wherein the support body, the axle, the operating lever, and the first and second actuating members are formed of a plastics material.

7. A joystick control as claimed in claim 6, wherein the plastics material of the operating lever, the first and second actuating members and the support body is a glass fibre reinforced nylon.

8. A joystick control as claimed in claim 1, further comprising a gearbox connected by two Bowden cables to the joystick control, wherein the gearbox has two gear ratio selectors, a first selector being movable by a first Bowden cable from a neutral position in one direction to select a first gear ratio and from the neutral position in an opposite direction to select a second great ratio, and a second selector being movable by a second Bowden cable from a neutral position in one direction to select a third gear ratio and from the neutral position in the opposite direction to select a fourth gear ratio, wherein pivoting of the operating lever about the pin relative to the axle has no effect on the Bowden cables nor the positions of the gear ratio selectors.

9. A joystick control as claimed in claim 1, wherein the operating lever is rotatable about the axis of the axle in one plane and is pivotable relative to the axle about the axis of the pivot pin in an orthogonal plane.

10. A joystick control as claimed in claim 8, wherein the operating lever is rotatable about the axis of the axle in one plane and is pivotable relative to the axle about the axis of the pivot pin in an orthogonal plane.

11. A joystick control as claimed in claim 10, wherein each of the first and second actuating members lever is rotatable by the operating lever between a neutral position, an up position in which the associated Bowden cable is extended and a down position in which the associated Bowden cable is retracted.

12. A joystick control as claimed in claim 11, wherein the mating formations on the operating lever and the first and second actuating members are such that the operating lever can only be disengaged from one of the actuating members and engaged with the other when both the first and second actuating members are in their respective neutral positions.

13. A joystick control as claimed in claim 12, wherein the mating formations comprise a first notch defined in the first actuating member and a second notch defined in the second actuating member, the first and second notches being configured to selectively receive the operating lever in dependence upon a direction in which the operating lever is pivoted relative to the axle about the pin.

14. A joystick control as claimed in claim 13, wherein a spring is provided to urge the operating lever to engage one of the first notch or the second notch.

15. A joystick control as claimed in claim 4, wherein the first notch is configured to receive the operating lever when the operating lever is pivoted relative to the axle about the pin in a first direction, the second notch being configured to receive the operating lever when the operating lever is pivoted relative to the axle about the pin in a second direction.

16. A joystick control as claimed in claim 4, wherein the first and second notches are aligned when the first and second actuating members are in the neutral position and are misaligned when one of the first actuating member or the second actuating member is in one of the up position or the down position.

17. A joystick control as claimed in claim 4, wherein, when the operating lever is received within the first notch and the first actuating member is moved to the up position or the down position, the second actuating member is maintained in the neutral position.

\* \* \* \* \*